US 6,498,612 B1

(12) United States Patent
Brown et al.

(10) Patent No.: US 6,498,612 B1
(45) Date of Patent: Dec. 24, 2002

(54) DIRECTORY SERVICES USER-INTERFACE EXTENSIONS ARCHITECTURE

(75) Inventors: Eric C. Brown, Seattle, WA (US); David G. De Vorchik, Seattle, WA (US); James D. Harriger, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/158,239

(22) Filed: Sep. 22, 1998

Related U.S. Application Data

(63) Continuation of application No. 09/158,023, filed on Sep. 21, 1998, and a continuation of application No. 09/157,773, filed on Sep. 21, 1998.

(51) Int. Cl.[7] .............................................. G06F 17/30
(52) U.S. Cl. ...................................... 345/762; 707/101
(58) Field of Search .......................... 707/103 R, 101, 707/104, 100, 103; 345/762, 744, 764, 853

(56) References Cited

U.S. PATENT DOCUMENTS 5,596,702 A * 1/1997 Stucks ........................ 345/781
5,956,736 A * 9/1999 Hanson et al. .............. 707/513
5,983,234 A   11/1999 Tietjen et al.
5,987,471 A * 11/1999 Bodine et al. .............. 707/103

OTHER PUBLICATIONS

Steedman, D., *X.500 the directory standard and its application*, Technology Appraisals, 1993, 1–165.
Solomon, D.A., "The Official Guide to the Architecture and Internals of Microsoft's Premier Operating System", *Inside Windows NT® Second Edition*, Microsoft® Press, 1998.

* cited by examiner

*Primary Examiner*—Cao H. Nguyen
(74) *Attorney, Agent, or Firm*—Woodcock Washburn LLP

(57) ABSTRACT

An extensible user interface architecture is disclosed. The interface operates by storing user interface information in a display database, preferably part of a directory services database. The data to be displayed, preferably directory objects, are bound to the display information in the display database. The user interface application retrieves display information from the display database based on the object to be displayed. The display information for an object is contained in a display specifier, which contains pointers to software modules. After retrieving the display specifier, the user interface application parses out the software module pointers, which are then executed to display aspects of the data to be displayed. As a result, the user interface can be extended by changing the information, i.e., software pointers, contained in the display specifier.

45 Claims, 12 Drawing Sheets

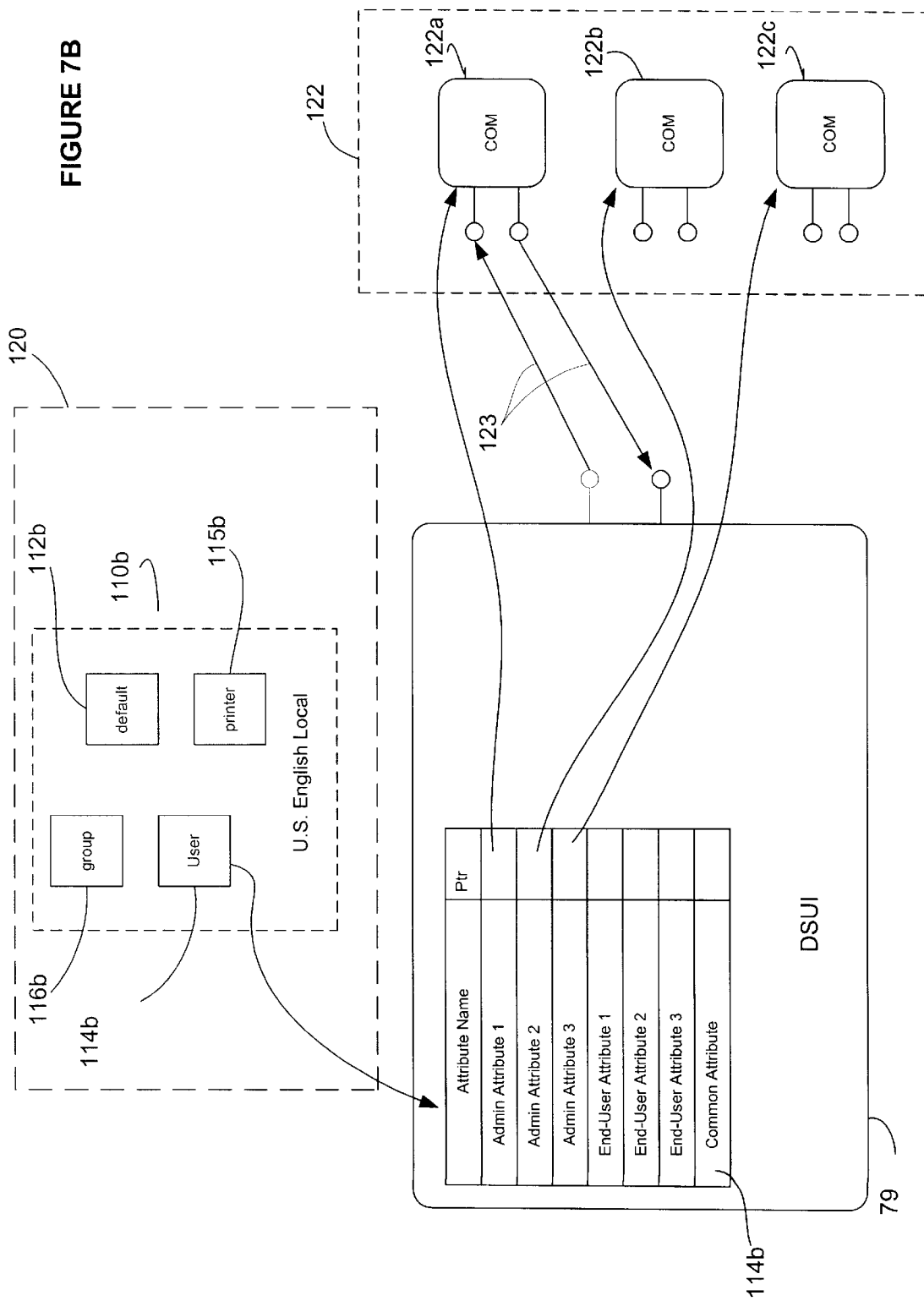

DIRECTORY SERVICES USER-INTERFACE EXTENSIONS ARCHITECTURE

CROSS-REFERENCE TO RELATED APPLICATIONS

This application is a continuation of U.S. application Ser. No. 09/157,773, filed on Sep. 21, 1998, and entitled EXTENSIBLE USER INTERFACE FOR VIEWING OBJECTS OVER A NETWORK, and related to co-pending U.S. application Ser. No. 09/158,023, filed on Sep. 21, 1998, and entitled CLASS STORE SCHEMA.

TECHNICAL FIELD

The present invention relates generally to computer systems and more particularly to the management of directory objects in a directory service.

BACKGROUND OF THE INVENTION

The network computing model, in which intelligent client computers are connected to multiple server computers, is quickly becoming the dominant computing model for enterprises, intranets, and the Internet. At the same time, the network computing model is itself rapidly evolving. As the network technology matures, networks of servers and clients have been and are continuing to replace systems of mainframes and terminals and other computing paradigms, which were once considered more advanced. Cost and productivity are among the primary factors driving the changeover to the client server network model. Relatively inexpensive servers and client computers and off-the shelf software applications are replacing expensive centralized mainframes and cumbersome custom developed software applications.

The network computing model purportedly offers a robust computing environment in which multiple servers provide redundancy to a multitude of clients. However, as the deployment of networks has gained momentum, it has brought its own set of issues. Instead of providing a centralized location from which every aspect of the network can be controlled, computing power is decentralized requiring configuration and control over computers at a number of disparate physical locations. As a result, maintaining the computers and the applications they run at the disparate locations can involve substantial costs.

As the network computing model continues to take hold, computer networks have become an increasingly important tool for users to share access to system resources such as programs, data, printers, and so on. Many attempts have been made to provide a structure for sharing access to resources in a computer network. A particularly important development in structuring access to system resources is the hierarchical directory service. One of the more significant attempts to standardize a directory service is the X.500 directory standard (also known ISO 9594).

Although the X.500 standard offers a basic structure for directory services, it does leave some issues unresolved. Extensibility and providing for a common user interface are among the issues. Adding new resources to the network environment has required making extensive adjustments throughout the network at various client computers and server computers, rather than at a single point. In particular, adding a new resource to the network often requires an administrator to physically go to each computer on the network and reconfigure the computer to enable it to recognize the new resource, e.g., to display attributes of the resource in a user interface. Of course, making all of these adjustments to the system at multiple locations increases the likelihood that an incorrect adjustment will disrupt the operation of the network. In other words, extending the network system has incurred a high cost and created the likelihood that resource extensions would be disruptive to the operation of the network, resulting in lost productivity to the network users.

Moreover, a user interface must be provided for network users to access and view attributes of the network resources. However, in a network with a large number of users, separately reconfiguring the user interface on each user's computer would be costly and time consuming. Ideally, when a new resource is added to the network and made available to the network users, e.g., through a directory service, all user interfaces should instantly recognize the resource without the need to reconfigure the user interface.

For example, if an administrator wants to add a new scanner resource to the network and make that scanner resource available to all of the network users, information about the scanner should be published in the directory. Thereafter, users could locate the scanner by way of the directory and have the capability to view attributes of the scanner via a user interface. However, if the directory does not support scanner resources, the administrator would have two alternatives: (1) fit the scanner attributes into an existing resource type (alternately referred to as an object class), such as a printer object class; or, (2) define a new object class tailored to scanners. Potentially, alternative (2) may not even be available. In that case, the administrator would have no choice other than to add the new resource as an existing object class.

Under the first alternative, the administrator would add the scanner resource to the directory under the closest available object class, e.g., a printer class. Hence, a user would view the scanner as if it were a printer, even though there may not be complete overlap of attributes. If the new resource closely matches an existing object class, this alternative is satisfactory. However, when no suitable object classes are available for a new resource, this alternative has obvious shortcomings.

Under the second alternative, the administrator would define a new object class to support the scanner resource. Hence, a user should view the scanner as if it were a scanner. But, to view the scanner resource as a scanner, the administrator would have to make extensive changes throughout the network so that each user's user interface would be able to display all of the attributes of the scanner resource. For example, the administrator would have make changes to the object definitions structure (i.e., the schema) defining the new object class, the computers of all users to provide them with user interface software that recognizes the new object class, and so on.

The cost of such changes are high as is the risk that an inadvertent error made while making the changes will disrupt the operation of the network. Instead, the changes to add the new resource and to add user interface information about the resource should be made from a central location and propagated across the network.

Thus, there is a need for an extensible resource sharing environment in a computing network in which user interface information can be propagated across a computer network.

SUMMARY OF THE INVENTION

A network typically comprises a number of workstation clients coupled to one or more servers, such as data servers. Moreover, where the workstation clients share access to data stored by the data servers, such as directory service data, a common data access user interface for all workstation clients is desirable.

The present invention provides an extensible data access user interface by storing user interface information in a display database, preferably part of a directory services database stored on a server, and then coupling that user interface information to the data it will display. To provide the extensible user interface executing on a workstation, a display object that is bound to an object to be displayed is retrieved from the database. Next, the display object is parsed for attributes containing pointers to software modules. The software modules are then fetched by way of the pointers and executed to display aspects of the data object.

Preferably, the pointers contain a pointer to a database of software component modules that can be stored either locally on the workstation, remotely on a server, or both. The user interface application will first check to see if the software module is stored locally on the workstation. If the module is not found locally, then the user interface application will attempt to retrieve the module from the server over the network.

Thereafter, when an administrator wants to modify or extend an interface, for example after a database schema is changed, changes are made to the display database and not locally. When data is then displayed on a workstation, the data's display information is retrieved from the display database. Accordingly, changes or additions to the user interface software modules or data records are propagated to all workstations that access the display database or software modules.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 7B shows further details of the interaction of the extensible user interface software with the display specifier database and the class store database;

DETAILED DESCRIPTION OF THE INVENTION

Overview

The present invention addresses the need for an extensible common data access user interface by storing user interface information in a display database, preferably part of a directory services database, and then coupling that user interface information to the data it will display. The directory service contains objects that have information about resources available on the network, such as users, groups, printers, and the like. For the objects to be of value to networks users, the network user should have the capability to display attributes, i.e., details, contained within the object. Hence, a user interface is employed to display details of the object.

In order to have an extensible user interface, display specifiers are maintained on the network to provide display instruction information. The display specifiers are preferably maintained as part of the directory service. Hence when a directory object is to be displayed, its corresponding display specifier is located and interpreted to display the object. In this way, when an administrator wants to modify or extend an interface, for example after the directory objects are added, the administrator need only change the display specifiers. As a result, user interface changes automatically propagate through the network.

Exemplary Operating Environment

1. A Computer Environment

Figure 1:
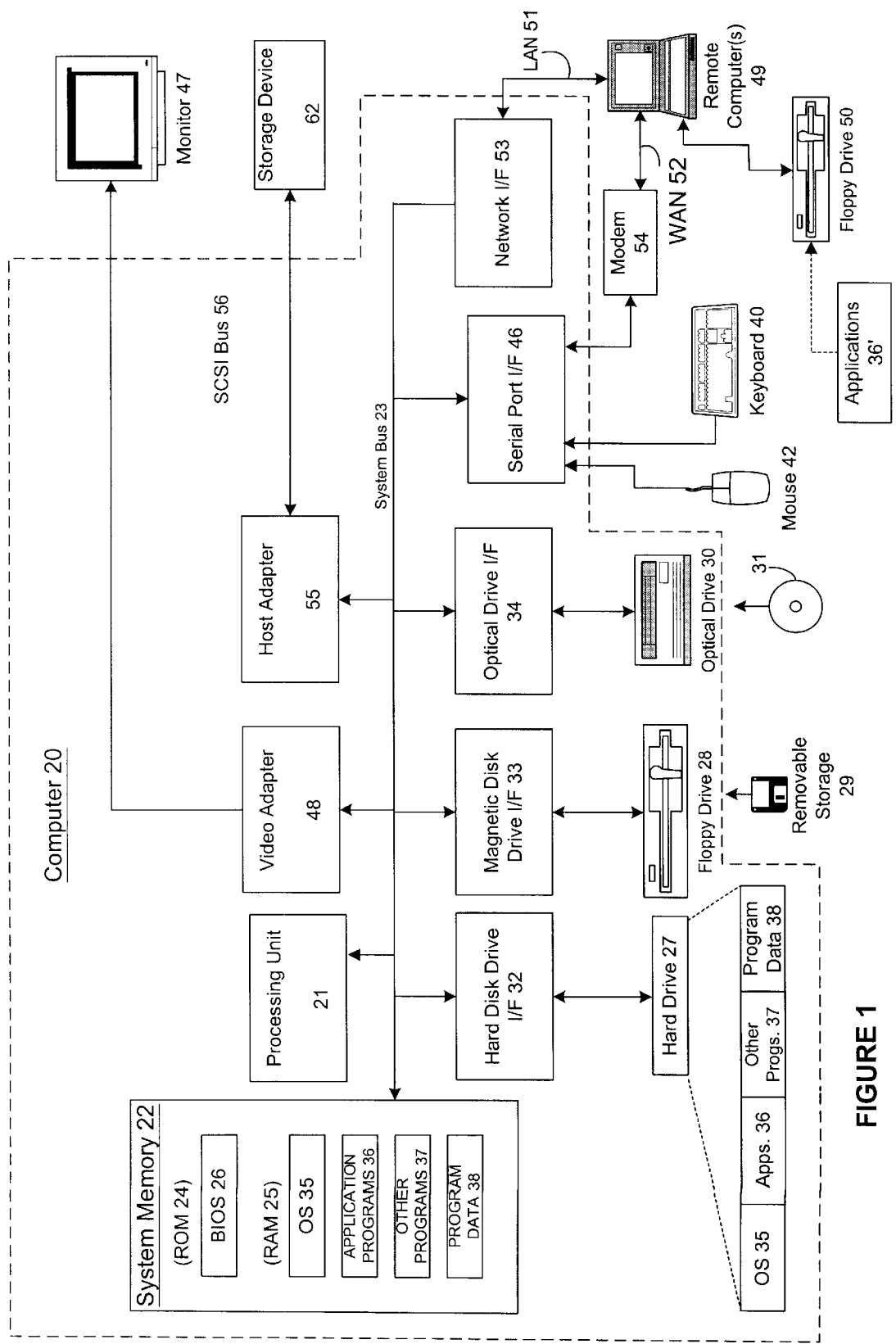
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading rom or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
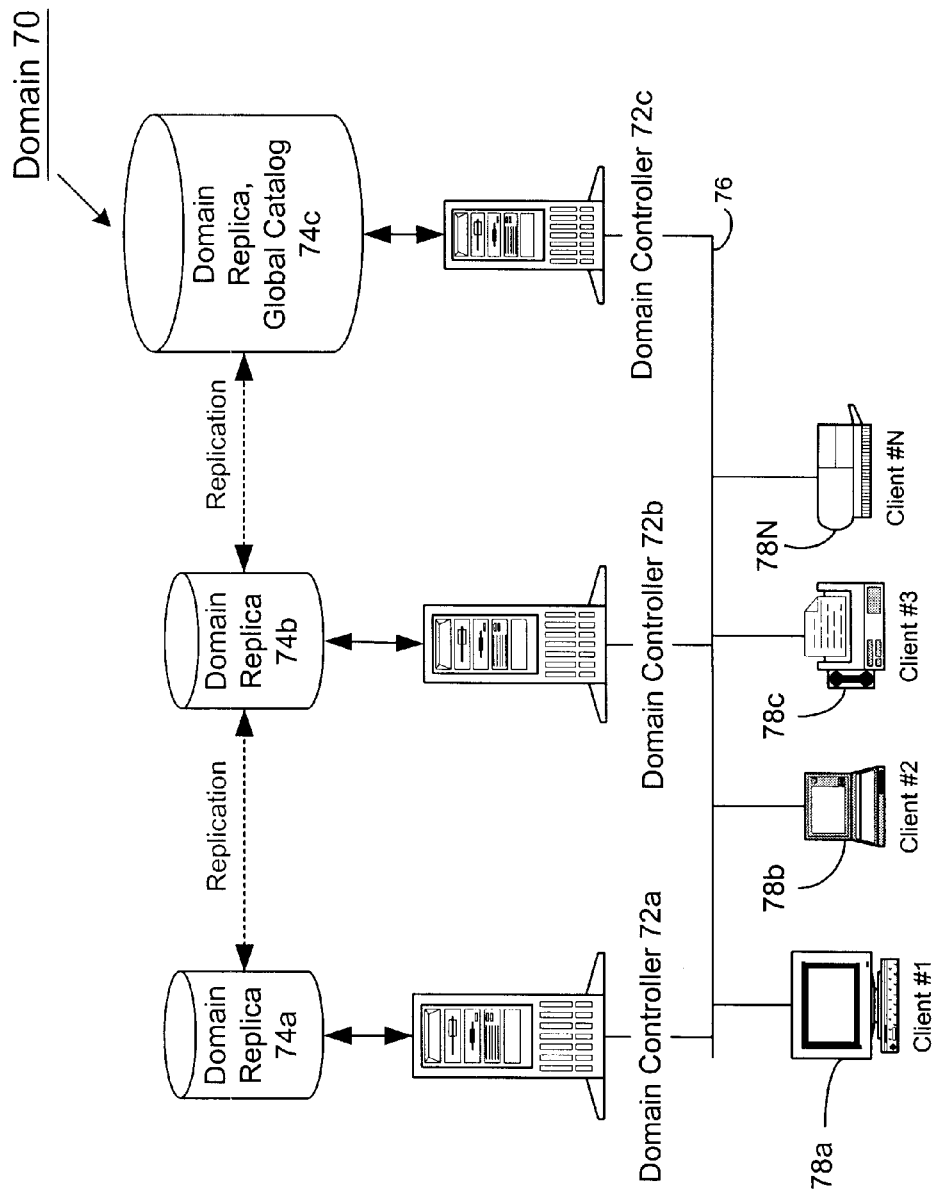
FIG. 2 is schematic diagram representing a network domain in which aspects of the present invention may be incorporated.

As noted, the computer described above can be deployed as part of a computer network. In general, the above description applies to both server computers and workstation computers deployed in a network environment. FIG. 2 illustrates an exemplary network environment in which the present invention may be employed. FIG. 2 shows a network of workstation and servers organized in an exemplary organizational unit domain 70, where the domain presents a common security boundary within a network. As shown, it includes a plurality of servers 72a, 72b and 72c, which are configured as domain controllers and include a corresponding replica 74a, 74b and 74c, respectively, of a directory maintained by the domain. The function of the directory is described in further detail below in connection with FIG. 3. The domain controllers are interconnected by a bus 76, which in turn couples various clients including workstation 78a, notebook 78b, facsimile machine 78c, printer 78N, and so on, to the domain controllers. As shown in FIG. 2, the domain 70 provides multi-master replication, meaning that all replicas of a given partition are writeable. This allows updates to be applied to any replica of a given partition. The directory replication system propagates the changes from a given replica to all other replicas. In the past, it had been common to employ two kinds of domain controllers: Primary domain controllers (PDCs) and backup domain controllers (BDCs), where the PDCs held a read/write copy while the BDCs held a read-only copy. In the example of FIG. 2, all domain controllers for the domain are considered peers in that each holds a writeable copy of the directory.

As noted above, the network domain maintains a directory that is accessible over the network. The provision of directory information on the network is typically called a directory service. The directory service component of a distributed computing environment is intended to make it easier to find information. A directory service is like a phone directory. Given a name for a person or a resource, it provides the information necessary to access that person or resource. Administrators, users, and applications can find information about people, printers, files, and other shared resources in a single place even if the resources reside on many different physical servers. The directory may be viewed as a distributed database of information about objects, including people, organizations and processes. Objects are assigned to logical workgroups or other organizational units rather than to individual servers. This location independence is fundamental to making distributed computing simple to use and easy to manage. It is even possible to define standard interfaces to the directory so that other directories can integrate with it. In fact, the directory can present information from multiple sources as a single system directory object.

Figure 3:
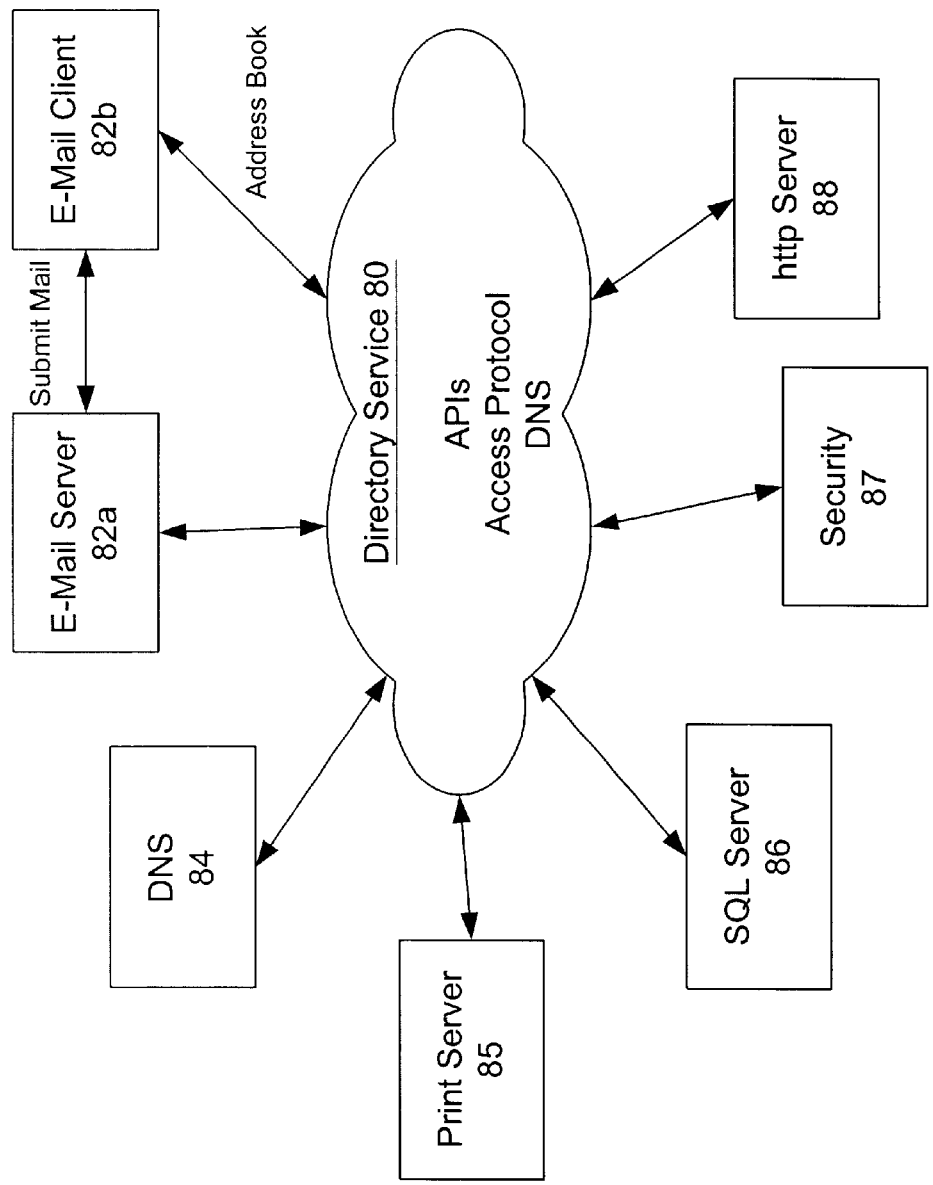
FIG. 3 is a block diagram of a directory service that operates in a network environment and in which aspects of the present invention may be incorporated.

FIG. 3 schematically depicts how a directory service 80 provides a logically centralized location for finding shared resources. Such shared resources may include, e.g., an e-mail server 82a or address book for use by an e-mail client 82b, the Domain Name System (DNS) 84 (the locator service used on the Internet), a print server 85, a database (e.g., SQL) server 86, a security server 87, and an http server 88. One protocol for directory access is the industry-standard LDAP (Lightweight Directory Access Protocol), which allows for extensive interoperability with directory services from multiple sources. The directory service 80 insulates users and administrators from having to navigate the physical structure of the network.

The directory service 80 may make use of the features of DNS and the OSI X.500 directory standard. For example, since DNS may be used as a global backbone namespace, the directory service may use DNS to look up LDAP services. In addition, multiple application programming interfaces (APIs), such as MAPI and LDAP C may be employed to facilitate the writing of directory-enabled applications that access the directory.

Most enterprises already have many different directories in place. For example, network operating systems, electronic mail systems, and groupware products often have their own directories. Many issues arise when a single enterprise deploys multiple directories. These issues include usability, data consistency, development cost, and support cost, among others. It is common to find a variety of directories (many playing an administrative role) deployed within a single organization. The goal of a directory service such as that discussed above is to provide a single, consistent set of interfaces for managing and using multiple directories. A directory service differs from a directory in that it is both the directory information source and the services making the information available and usable to the users.

A directory of the kind provided by the directory service 80 is, or may be viewed as, a namespace, i.e., a bounded area in which a given name can be resolved. Name resolution is the process of translating a name into some object or information that the name represents. For example, a telephone book forms a namespace in which the names of telephone subscribers can be resolved to telephone numbers. Likewise, the directory service 80 provides a namespace in which the name of an object in the directory can be resolved to the object itself. (An "object" is a distinct, named set of attributes that represents something concrete, such as a user, a printer, or an application. The attributes hold data describing the thing that is identified by the directory object. Attributes of a user might include the user's given name, surname, and e-mail address.)

Figure 4:
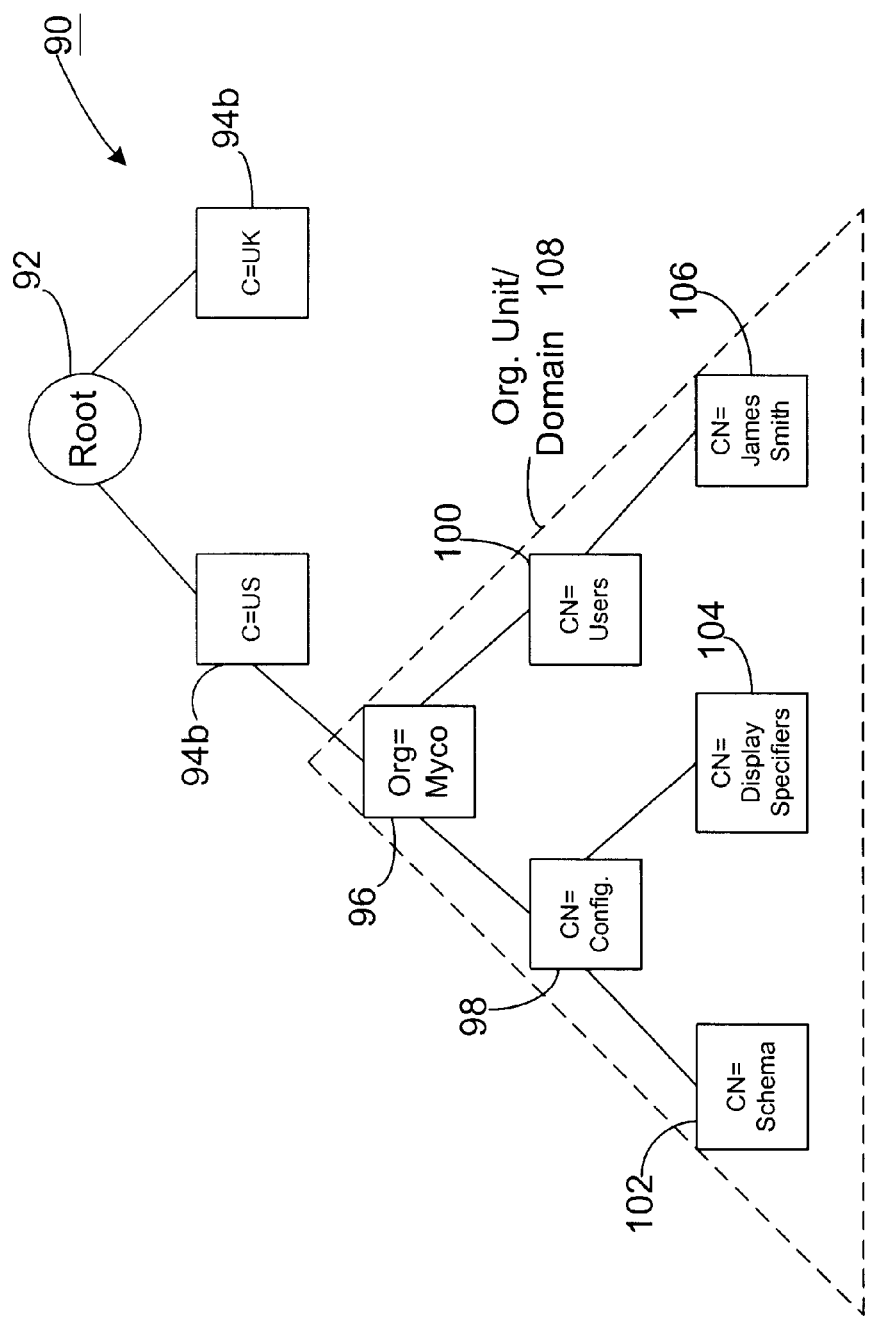
FIG. 4 is a directory tree diagram showing further details of the arrangement of the directory service of FIG. 3.

FIG. 4 depicts an exemplary hierarchical namespace 90. This namespace includes a root 92 and a tree comprising a hierarchy of objects and containers. (A container is like an object in that it has attributes and is part of the namespace. However, unlike an object, it does not represent something concrete. It is used to hold or organize a group of objects and/or other containers.) Endpoints on the tree are usually objects. Nodes or branches are containers. A tree shows how objects are connected or the path from one object to another. A simple directory is a container. A computer network or domain is also a container. The namespace of FIG. 4 includes: two country nodes 94a and 94b(corresponding to country=U.S. and country=U.K., respectively), and a subtree under node 94a comprising nodes 96 (organization= Myco); nodes 98 and 100 (common name=config. and common name=Users, respectively); and nodes 102, 104 and 106 (common name=Schema, Display Specifier and JamesSmith). As indicated in FIG. 4, node 96 and its children nodes may be viewed as an organizational unit 108, which is also called a "domain." The organizational unit/ domain is served by a closely coupled set of servers, or domain controllers.

As noted above, a domain is a single security boundary of a computer network. The directory is made up of one or more domains. On a standalone workstation, the domain is the computer itself. A domain can span more than one physical location. Every domain has its own security policies and security relationships with other domains. When multiple domains are connected by trust relationships and share a common schema, configuration, and global catalog, they make a domain tree.

Extensible User Interface

As described in detail above, many of the system resources are represented as objects stored in the directory service. The network system recognizes the objects by the class to which the object belongs. Every object must fit into a class that is defined by a schema. For each object class, the schema defines what attributes an instance of the class must have, what additional attributes it may have, and what object class can be a parent of the current object class. As indicated above, the schema is generally maintained as part of the hierarchical directory service. Typical object classes include users, groups, printers, and the like. If there is no existing object class for an object to be added to the directory service, a new object class can be added by extending the schema. Moreover, an existing object class can be modified by changing its attributes defined in the schema.

Figure 5:
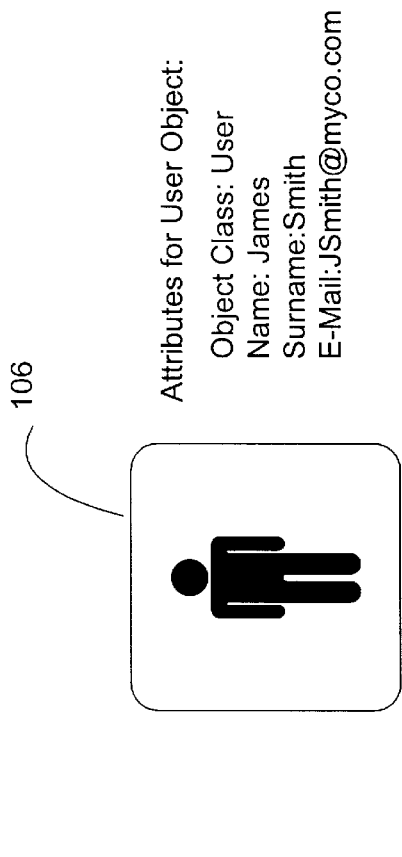
FIG. 5 is an instance of an exemplary user object.

FIG. 5 shows an example of a user object 106. In this example, the user attributes include Object Class, Name, Surname, and E-mail address. An object has one name, its Distinguished Name (DN). The DN uniquely identifies the object in the directory hierarchy and contains sufficient information for a client to retrieve the object from the directory. Objects are accessed in the directory via wire protocols such as LDAP.

Figure 6:
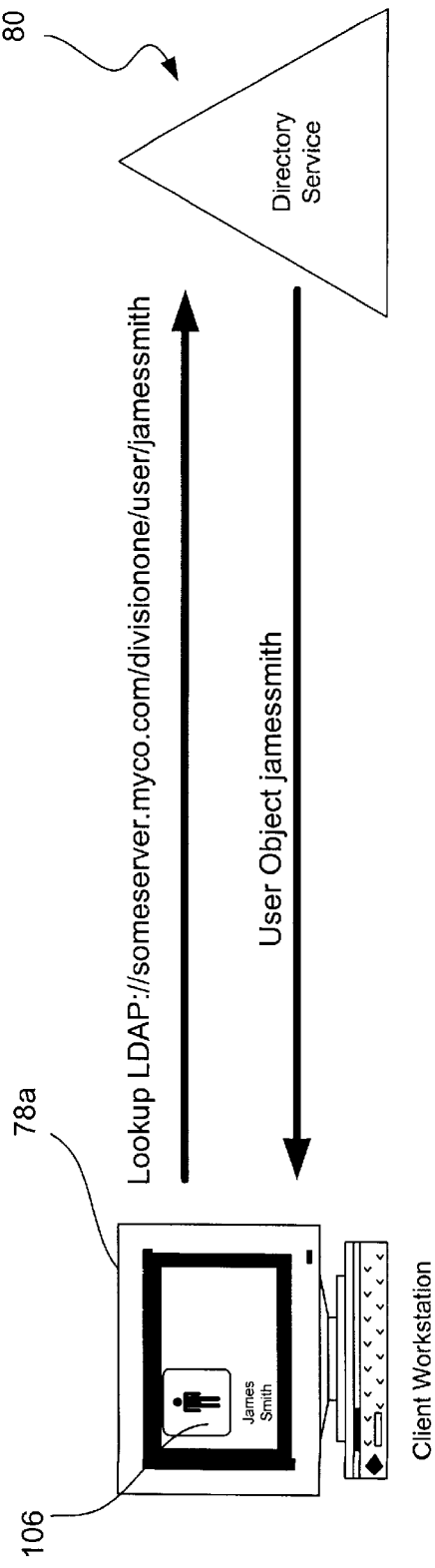
FIG. 6 diagrammatically depicts a user request for an object from a directory service.

As shown in FIG. 6, when an end-user wants to find an object in the system, a query is presented in a form recognizable by the directory service. In the example of FIG. 6, an end-user at workstation 78a queries directory service 80 to lookup the user object 106, "James Smith." The query takes the form of a request in a protocol understood by directory service 80, such as LDAP. This particular example takes the form of the LDAP command: "LDAP:// server.myco.com/divisionone/user/jamessmith/." In response to the query, directory service 80 returns user object 106, "James Smith," which can then be displayed on the workstation 78a in a form understandable to the end-user. The end-user can then use the information displayed to find out further information about user object 106. For example, the object "James Smith" contains the e-mail address of "James Smith." As such, the end-user can locate object 106, get the e-mail address, and then send an e-mail message to the e-mail address of "JSmith@myco.com." Similarly, an end-user may want to find the location of a printer, a scanner, or similar system resource and could similarly form a query or browse the directory service 80 to locate the desired object or objects.

In addition to an end-user, a system administrator may also desire information about objects in the network system. For example, the administrator may desire to modify information contained in an object, add an attribute, or add a whole new object class. Because the operations performed on objects by the administrator may vary considerably from the operations performed on objects by an end-user, the information for a particular object that is displayed on the screen of the administrator may also vary considerably from the information for the same object when displayed on the screen of an end-user.

In addition to the different views of an object by an administrator versus an end-user, the administrator should also be able to add new object classes to the system and have the end-user directory interface recognize and display objects of the new class. As described more fully below the present invention employs "display specifiers" to describe how objects are to be displayed.

A display specifier is an object class that contains information about the display of other objects. Preferably, here is a display specifier for each class of object to be displayed. Hence, there is a display specifier corresponding to user class objects, a display specifier corresponding to printer class objects, and so on.

Figure 7A:
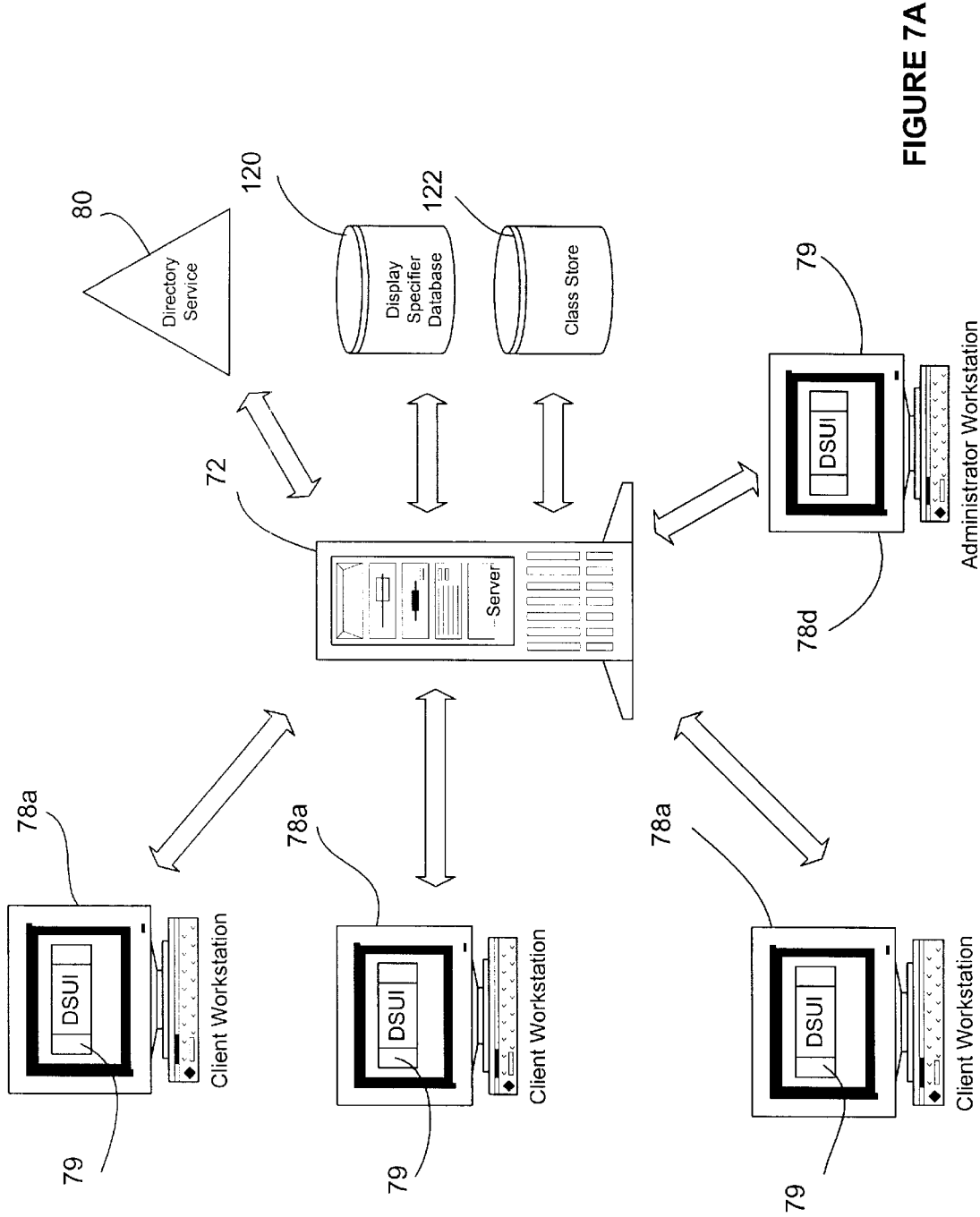
FIG. 7A shows an overview of the extensible user interface to a directory service in accordance with the present invention.

A system architecture for displaying objects from the directory service 80 is shown in FIG. 7A. The architecture comprises a number of client workstation computers 78a (presumably end-users) and an administrator workstation computer 78d (only one is shown for exemplary purposes). Server 72, which can be any one of the domain controllers 72a, 72b, 72c but is shown here for clarity, provides access to directory service 80, display specifier database 120, and class store 122.

Each end-user workstation 78a is running a software application Directory Service User Interface (DSUI) 79, which can be stored on any of the storage devices as described above in reference to FIG. 1. Similarly, the administrator workstation 78d is running DSUI 79. DSUI 79 controls the interaction of the workstations 78a, 78d with the directory service 80, and the databases 120, 122 via server 72. Queries to the directory service 80 are handled by a server, e.g., server 72, which locates the requested directory service 80 and routes the requested object or objects back to the requesting workstation 78a or 78d.

In order to display the information contained in the object obtained from directory service 80, the display specifier corresponding to the object class of the object to be displayed is also retrieved. Thus, after obtaining an object, DSUI 79 will request the required display specifier from the display specifier database 120 by way of server 72. After obtaining the corresponding display specifier, the enduser's or administrator's DSUI 79 can then interpret the contents of the display specifier to display the object.

FIG. 7B further illustrates the interaction of the DSUI 79 with the display specifier database 120 and the class store 122. As shown, display specifier database 120 contains display specifiers (112b, 114b, 115b, and 116b are shown). The display specifiers are grouped by locale. For example, display specifiers 112b, 114b, 115b, and 116b are all contained in locale 110b, the U.S. English locale group. To display the object JamesSmith, DSUI first determined the locale for the requesting user (e.g., U.S. English) and then requested the corresponding user display specifier 114b. As shown, display specifier 114b contains a list of attributes and pointers. The attributes are categorized as admin attributes (corresponding to an administrator user), end-user attributes (corresponding to an end-user), and common attributes (corresponding to both administrators and endusers).

The pointer PTR contains a pointer that identifies a software module. For example, the admin attributes 1–3 point to COM modules 122a–122c, respectively. DSUI 79 then proceeds through the list of attributes and pointers and couples to the COM module pointed to via interface 123. If the user of DSUI 79 is an administrator then only the admin and common attributes are used. On the other hand, if the user is an end-user then only the end-user and common attributes are used. In this way, DSUI 79 presents a different interface for administrators and end-users.

As noted, a display specifier may contain pointer references to other software modules that are required by the workstation to display the contents of the object to be displayed. FIG. 7B shows a preferred embodiment wherein the software modules, preferably "MICROSOFT® COMPONENT OBJECT MODEL" (COM) modules, are stored in the class store. However, some of the software modules may already be locally resident on the workstation 78a, 78d. In such a case, DSUI 79 will first look for locally resident software modules before looking to the class store 122.

The COM modules are one construction of the more general concept of extending the behavior of DSUI 79. However, other constructions can be used to the same effect. For example, the display specifier could itself contain all of the code necessary to modify the behavior of DSUI 79. Alternatively, the pointers could be a full directory path name of other software programs to execute or provide links to a DLL. Other constructs include a URL to an HTML page or script, a pointer to a script in "JAVA", "VISUAL BASIC®", "PERL", or any other scripting language, or a pointer to a "CORBA" object if the "CORBA" broker is installed on the computer. In fact, any construct that results in the execution of computer code can be used if the operating system or extensions support it.

Preferably, DSUI 79 will operate in the "MICROSOFT® WINDOWS NT®" operating system environment. As such, the display specifier preferably contains information optimized to the "MICROSOFT WINDOWS NT®" environment. A display specifier stores information for property sheets, context menus, class icons, object creation wizards, and localized class and attribute names.

Property page attributes within the display specifier are preferably strings having the format:

<attribute-name>=<order-number>,<CLSID>, [optional data]

where the order number determines the page's position on the sheet. Order-numbers are sorted using a signed comparison such that there is no prescribed starting position and there can be gaps in the sequence and the CLSID, i.e., class identifier, is a string representation of a pointer to a program module and is enclosed in curly braces. Preferably, the CLSID is a universally unique identifier in accordance with the Component Object Module (COM) as described in detail in Dale Rogerson, Inside COM (MS PRESS ISBN: 1-57231-349-8). The optional data is passed to the COM object. Furthermore, the attribute name is either the string "Admin-Property-Pages," for use by administrator interfaces, or the string "Shell-Property-Pages," for use by end user interfaces.

Context menu attributes are essentially the same as the property page attributes. The only difference is that context menus use the attribute names "Admin-Context-Menu" for administrator interfaces and "Shell-Context-Menu" for end user interfaces. In addition, there is an attribute "Context-Menu" for menu items that are common to both interfaces.

The "Shell-" and "Admin-" prefixes on the attributes are examples of the type of prefixes used. However, other prefixes could be used to denote other special user interfaces. For example "Exchange-" or "Office-" could be used to provide "MICROSOFT® EXCHANGE" and "MICROSOFT® OFFICE" with context menus and property pages tailored to those applications, respectively.

Iconic images used to represent a class object can be read from the Display Specifier. Moreover, each class can store multiple icon states. For example, a folder class can have bitmaps for the open, closed, and disabled states. The attribute is named "Class-Icon" and can be specified in one of two ways.

ClassIcon=<state>, <DLL-name>, <resource-ID> where the state is an integer with a value between zero and 15. The value zero is defined to be the default or "closed" state of the icon. The value one is defined to be the "open" state of the icon. The value two is the disabled state. The other values are application defined.

The ICO-file-name or DLL-name must be the name of a file in the local workstation's file-search-path. The resource-ID is a zero-based index into the DLL's resource fork list of icons.

Creating new instances of an object can be automated by use of an object creation "wizard." Each class of object may specify the use of a specific creation wizard, or they may use a generic creation wizard. The description of a creation wizard COM object is stored in the single valued "Creation-Wizard" attribute as a string with the following format:

CreationWizard=<CLSID> where the CLSID, or class identifier, must be a string representation of a UUID enclosed in curly braces.

The description of a creation wizard extension COM object is stored in the multi-valued Create-Wizard-Ext attribute as a string with the following format:

CreationWizardExt=<order-number>, <CLSID> where the order-number determines the extension's position in the wizard. Order-numbers are sorted using a signed comparison such that there is no prescribed starting position and there can be gaps in the sequence. The CLSID, or class identifier, is a string representation of a UUID enclosed in curly braces.

Each object class may also have a class display name and each attribute of that class may have an attribute display name. The class display name is stored in the Class-Display-Name attribute as a single valued string. The attribute display names are stored in the Attribute-Display-Name attribute as multi-valued strings, wherein each element consists of a name pair separated by a comma: the first is the attribute LDAP Display Name; and the second is its corresponding user interface display name.

Any directory object can potentially be a container of other objects. This can clutter the user interface, so it is possible to declare that a specific class be displayed as a leaf element by default. The "Treat-As-Leaf" attribute holds a boolean value that, if True, indicates that the objects of the class should be treated as leaf elements, even if they are container objects.

An exemplary display specifier for an object class group is given below:

[group-Display]
objectClass=displaySpecifier
ObjectCategory=Display-Specifier
cn=group-Display
adminPropertyPages=1,{6dfe6489-a212-11d0-bcd5-00c04fd8d5b6}
adminPropertyPages=2,{6dfe648b-a212-11d0-bcd5-00c04fd8d5b6}
adminPropertyPages=3,{6dfe6488-a212-11d0-bcd5-00c04fd8d5b6}
adminPropertyPages=4,{4e40F770-369C-11d0-8922-00A024AB2DBB}
shellPropertyPages=1,{f5d121ee-c8ac-11d0-bcdb-00c04fd8d5b6}
shellPropertyPages=2,{dde2c5e9-c8ac-11d0-bcdb-00c04fd8d5b6}
contextMenu=0,{62AE1F9A-126A-11DO-A14B-0800361b1103}
adminContextMenu=1,{08eb4fa6-6ffd-11d1-b0e0-00c04fd8dca6}
classDisplayName=Group
attributeDisplayName=cn,Name
attributeDisplayName=c,Country,Abbreviation
attributeDisplayName=description,Dscription
attributeDisplayName=distinguishedName,X500 Distinguished
Name
attributeDisplayName=1,City
attributeDisplayName=managedby, Managed By
attributeDisplayName=member, Members
attributeDisplayName=notes, Notes
attributeDisplayName=physicalDeliveryOfficeName, Delivery
Office
attributeDisplayName=url, Web Page Address
treatAsLeaf=True As noted above, each object class is bound to at least one display specifier (there may be a one-to-many correspondence to deal with different user locales). Hence, after a desired object is found, the DSUI 79a, 79b should be able to locate a corresponding display specifier. The present invention contemplates three alternatives for binding an object class to a display specifier.

One construction is to modify the schema to add all of the display specifier attributes to the class object definition. While this is a simple approach, it requires a great deal of schema modification. Moreover, administrators would have to make extensive schema modifications for all new and changed DSUI behavior. Additionally, any errors made while modifying the schema could render the directory service unusable.

Figure 8A:
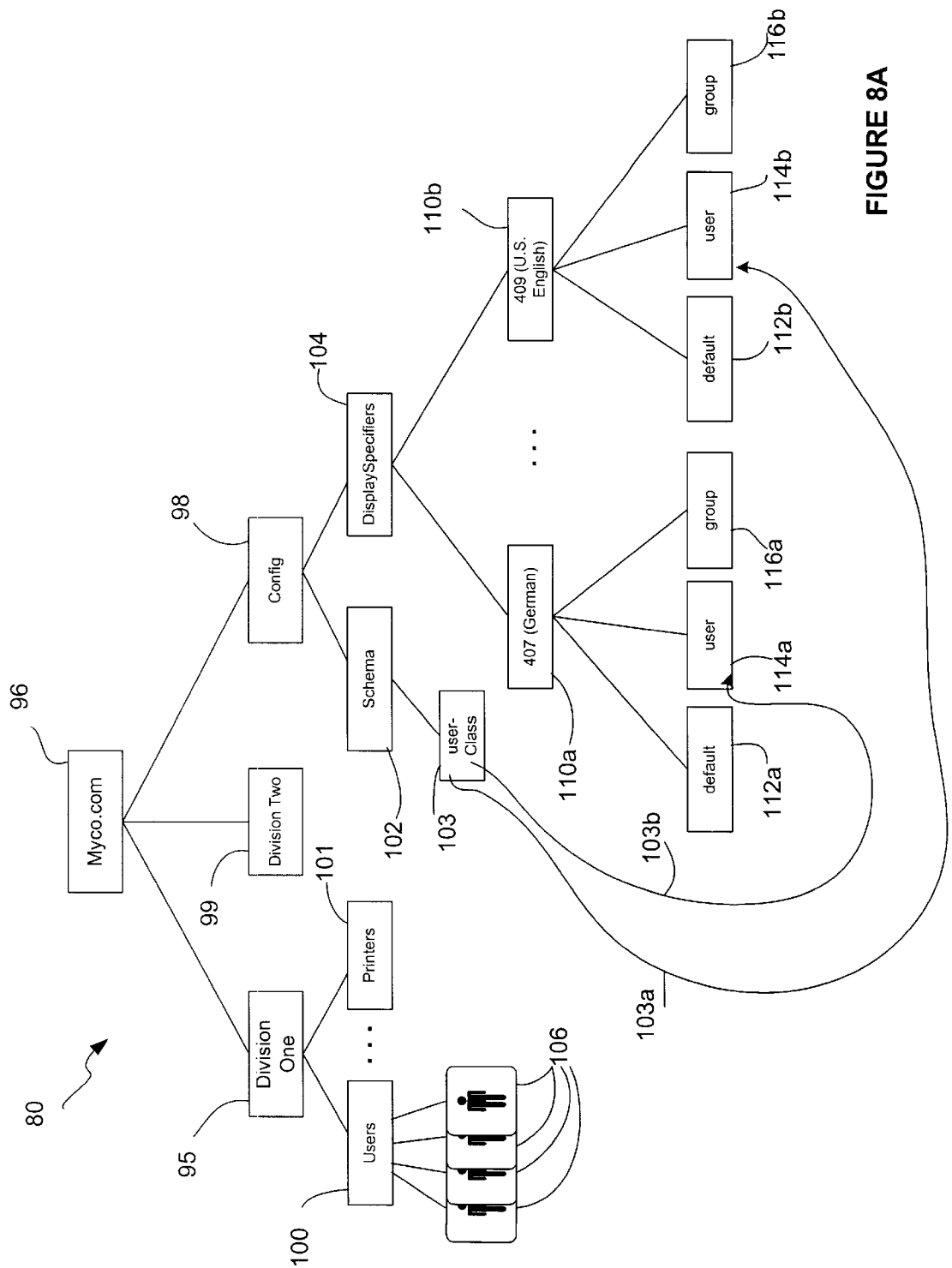
FIG. 8A shows a construction of binding directory objects to display information.

Another construction, shown in FIG. 8A, is to modify the schema to add a pointer to one or more display specifiers that could be differentiated based on such attributes as an end-user's locale. The attributes for the display specifiers would then be maintained separately from the schema describing the directory structure, such as in data base 120 (as shown in FIG. 7A). Thereafter, the DSUI 79 would look up an object class in the schema, obtain a pointer to the display specifier, and query database 120 for the display specifier. Preferably, the display specifier would itself be an object in the directory to which the schema points. Referring to FIG. 8A, a object-class of user 103 contained in the schema 102 contains a pointer 103a that points to the location of display specifier "user" 114b in the U.S. English locale 110b, and another pointer 103b that points to a display specifier 114a in the German locale 110a, and so on. This second construction still requires schema modification, although less so than the first construction described above.

Figure 8B:
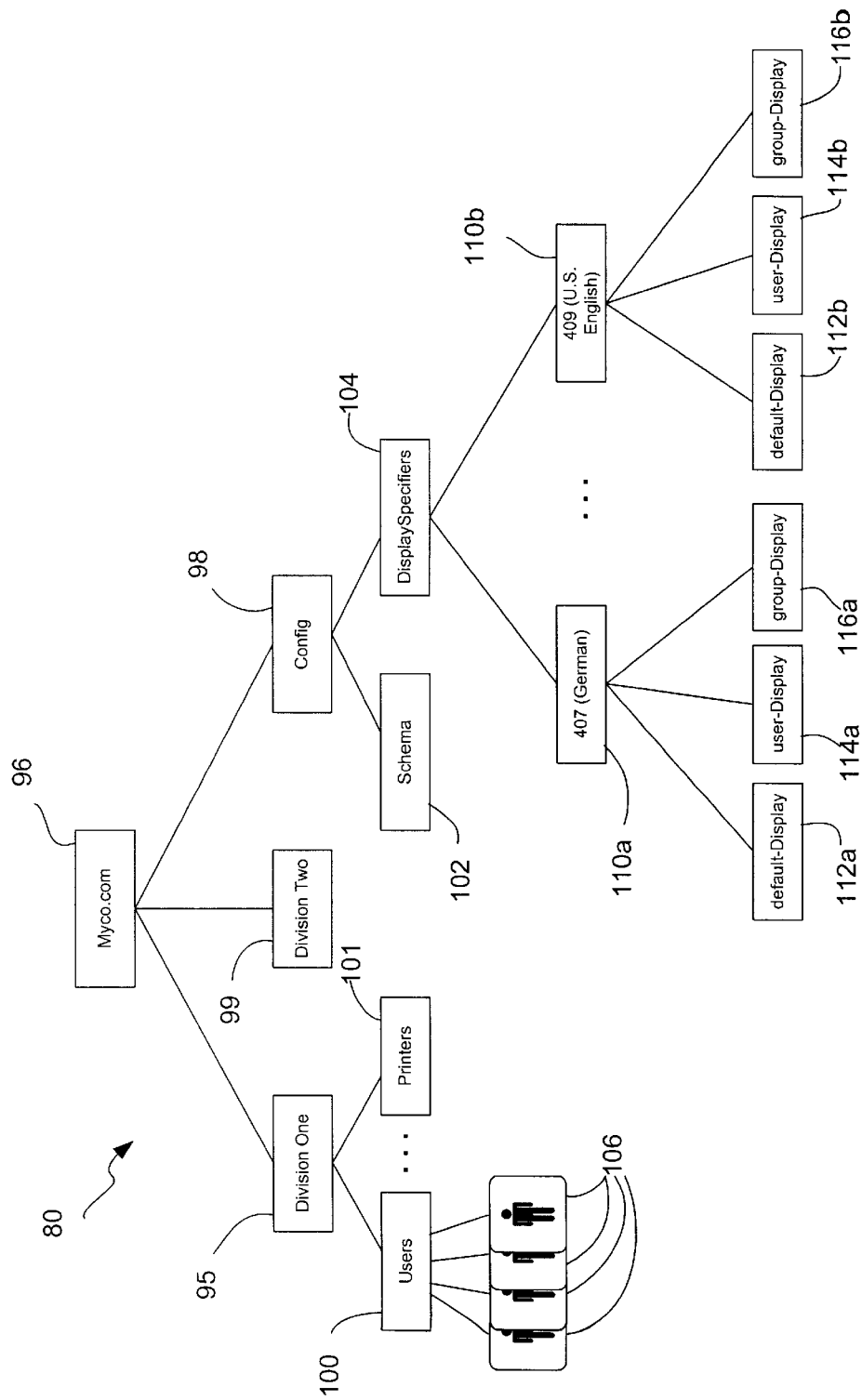
FIG. 8B shows another construction of binding directory objects to display information.

A third construction requires no schema modification. The third construction, illustrated in FIG. 8B, provides an implicit bind between objects and display specifiers. Here, a naming convention is used to bind objects to corresponding display specifiers. Preferably, the directory service 80 contains an organizational unit container 98 with the LDAP name "Config." The children of organizational unit Config comprise a container 104 with the LDAP name "DisplaySpecifiers," which in turn contains a number of locale containers 110a, 110b, and so on, e.g., "409", "411", and so on.

Each of the locale containers has an LDAP name corresponding to the hexadecimal representation of the locale identifier. For example, 409 represents the U.S. English locale and 407 represents the German locale. The display specifier is stored under the proper locale. Finally, the display specifier objects are stored as children of the locale containers and preferably have an LDAP name that corresponds to the object class with "-Display" appended to the end. In the example of FIG. 8B, the U.S. English locale—409—contains display specifier objects with LDAP names "user-Display," "group-Display," and "default-Display." The use of "-Display" is optional and primarily used to avoid confusion.

Figure 9:
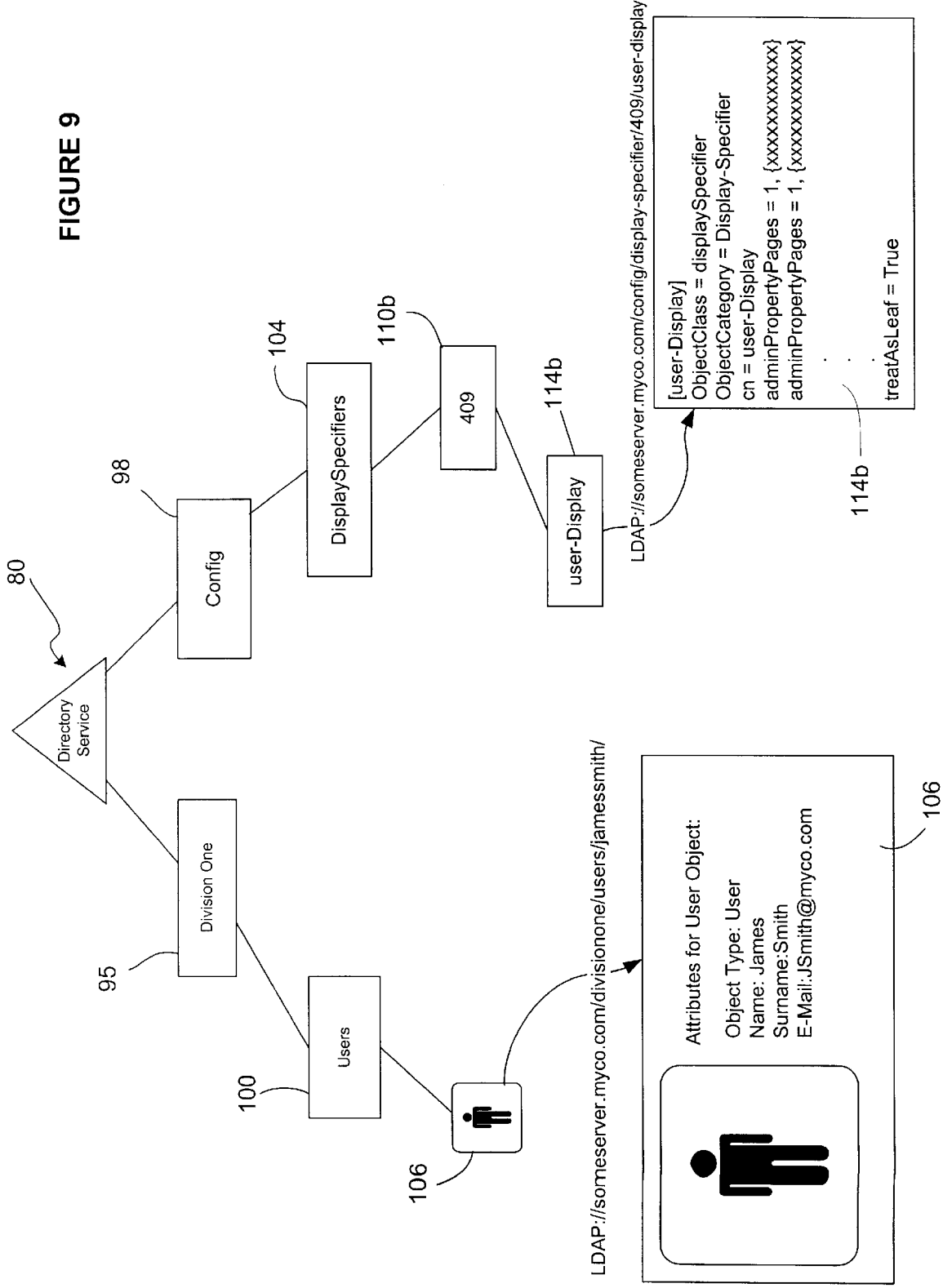
FIG. 9 is an example of the binding of a user object to a user-Display specifier.

FIG. 9 further illustrates the third construction. Here, a user object 106 is located with the LDAP URL: "LDAP://someserver.myco.com/divisionone/users/jamessmith/." After then retrieving the object, the object class is determined to be "user." The corresponding display specifier 114b is then implicitly pointed to by the LDAP URL: "LDAP://someserver.myco.com/config/displayspecifiers/409/userDisplay/."

By using an implicit pointer, no modifications need to be made to the schema when new object classes are created. All that is required is a display specifier object to be linked into the proper locales.

Figure 10:
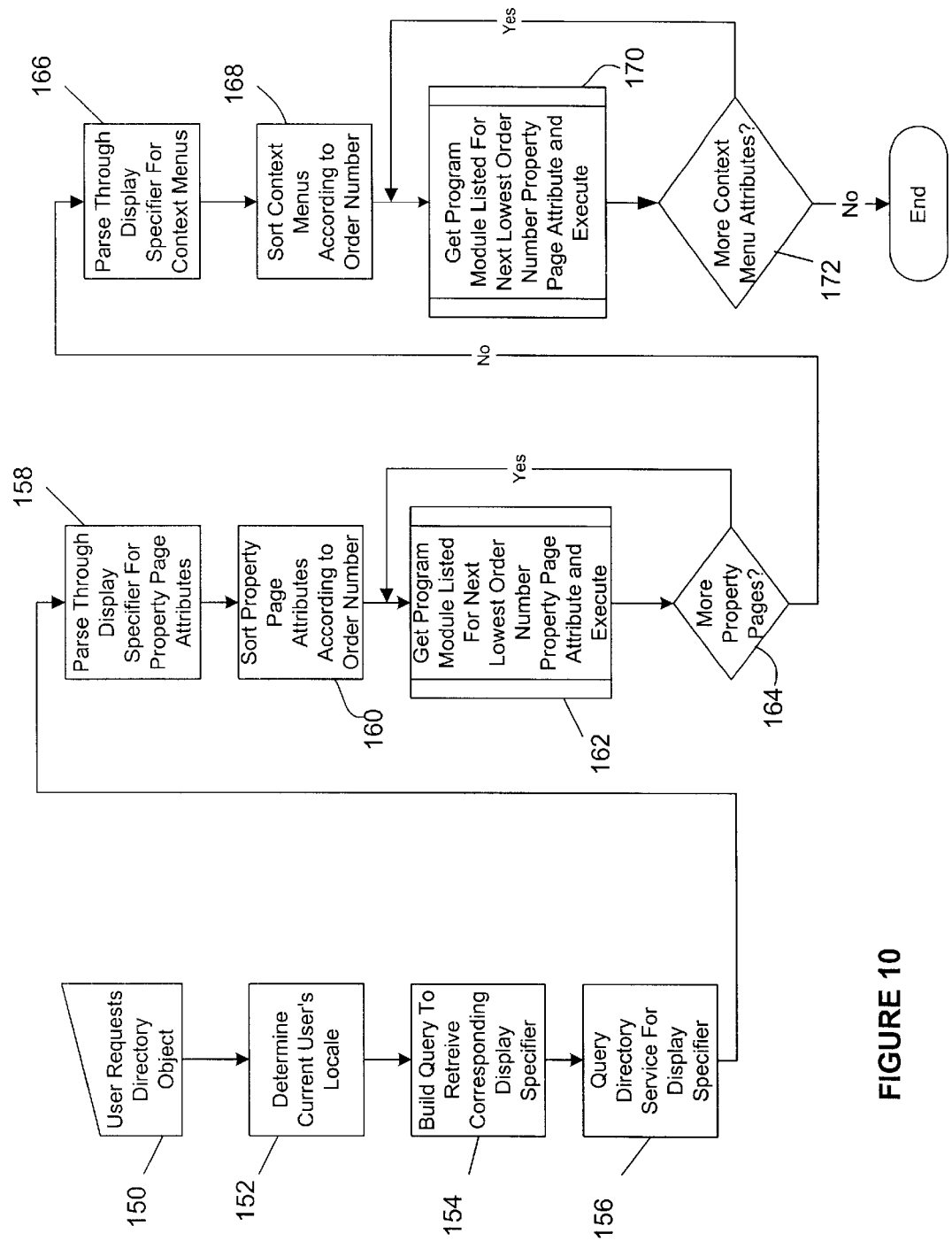
FIG. 10 is a flow chart of a process for displaying a directory object.
Figure 11:
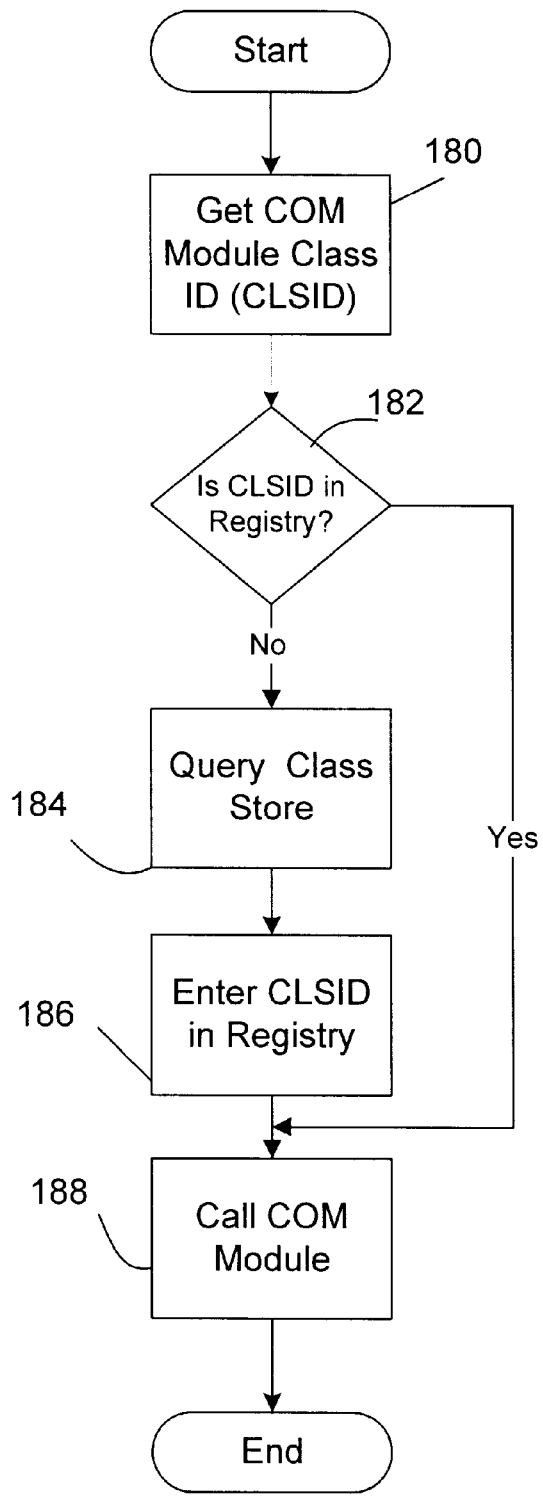
FIG. 11 is a flow diagram of a process for locating a software module over a computer network.

FIGS. 10 and 11 show a flow chart of the process of DSUI 79 that operates on the implicit display specifier and object class binding construction. The DSUI and all software modules that it calls execute on the end-user workstation 78a or administrator 78d. Those workstations 78a, 78d, conform to the computing environment as described in connection with computer 20 of FIG. 1. As such, the processes described below reside on a storage medium, e.g., system memory 22, hard drive 27, and so on. Moreover, the process execute on processing unit 21.

Referring to FIG. 10, initially, a user—end-user or administrator—requests a directory object (step 150). This request is made by direct query to the object URL or via a browsing mechanism. Once the object is retrieved, the current user's locale is determined (the user set the locale through the operating system) (step 152). From the object class, determined from the object, and the user's locale, the URL of the display specifier is built (see FIG. 9 for an example) (step 154). The directory service is then queried for the corresponding display specifier (156).

Once the display specifier is located, it is parsed to get the information necessary to build the user interface. First, the display specifier is parsed for property page attributes (158). As described in detail above, property page attributes are either "Admin-Property-Pages" or "Shell-Property-Pages." If the user is and end-user, then only "Shell-Property-Pages" attributes are used and "Admin-Property-Pages" attributes are ignored. On the other hand, if the user is an administrator, then only "Admin-Property-Pages" attributes are used and the "Shell-Property-Pages" attributes are ignored.

After extracting the property pages, the pages are sorted according to their order numbers, in increasing order (step 160). Each order number has an associated pointer to a software module. Preferably, the pointer is a CLSID that points to a COM module stored in the class store (see FIG. 7); however, it could be a pointer to another software module such as a complete file path name. The software module is retrieved, as described more fully below in connection with FIG. 11, and executes (step 162), e.g., control is passed to the software module. When the software module returns control, the process loops until all property pages have been processed (step 164).

A similar process is then repeated for the context menus. However, in that case, "Context-Menu" attributes are processed for both end-users and administrators. Additionally, "Admin-Context-Menu" attributes are executed only for administrators; whereas, "Shell-Context-Menu" attributes are processed only for end-users. The context menu processing is illustrated by steps 166–172 in FIG. 10.

Other processing is performed for Class Icons and Object creation Wizards wherein a pointer to a software module is provided in the attribute. The software module information is parsed and found as similar to the method use for property page attributes.

The details of an exemplary process for executing software modules pointed to by the display specifier attributes are illustrated in FIG. 11. FIG. 11 illustrates the operation with respect to COM modules. However, a similar operation can be performed using pointers to programs, DLLs, and the like. Initially, the COM module class id (CLSID) is determined. The CLSID is contained in the attribute. Then, the COM module with the given CLSID must be found. The COM module may be located either on the user's workstation or remotely, in the class store (see FIG. 7 and accompanying text). If the COM module desired has already been loaded on the users workstation, perhaps for the display of another object, it should be located in memory in a cache storage. Alternatively, it may be loaded in the workstation and entered in the local registry. In either case, if the COM module is located locally (step 182), control is passed to the COM module for execution (step 188).

If the COM module is not located locally, then it must be fetched from the network. Hence, a query is made to class store 122 to retrieve the required COM module. When the COM module is returned, control can be passed to it (step 188). First, however, it could be loaded permanently on the workstation and an entry for it made in the registry (step 186).

As with the display specifier database 120. The class store may also be tied to the directory service 80 to provide a centralized deployment of COM modules. In such a case, the COM modules would be stored as objects in a container object class store.

As described above, the present invention provides for centralized control over user interfaces in a networked computing environment. The invention enables the management and display of objects in a directory service.

While the invention is susceptible to various modifications and alternative constructions, certain illustrated embodiments have been shown in the drawings and accompanying detailed description. It should be understood, however, that there is no intention to limit the invention to the specific constructions disclosed herein. On the contrary, the invention is intended to cover all modifications, alternative constructions, and equivalents falling within the scope and spirit of the invention.

What is claimed is:

1. A method for displaying information contained in a data object, comprising the steps of:

retrieving a display object that is bound to the data object;

identifying in the display object an attribute containing a pointer to a software module comprising a plurality of computer readable instructions;

retrieving the software module by way of the pointer; and executing the software module to display aspects of the data object.

2. The method as recited in claim 1 wherein the software module is located on a remote computer accessible via a computer network.

3. The method as recited in claim 1 wherein the data object is stored in a directory service.

4. The method as recited in claim 1 wherein the pointer is a unique identifier.

5. The method as recited in claim 1 wherein the software module is fetched from one of a local storage device, a cache, and a storage device accessible over a computer network.

6. The method as recited in claim 1, wherein the display object is stored in a display database, and wherein the step of retrieving the display object comprises the step of:

building a database query based on the data object; and querying the database for the display object.

7. The method as recited in claim 6 wherein the display database is part of a directory service.

8. The method as recited in claim 7 wherein the display database is stored in a container object on the directory service.

9. The method as recited in claim 1, wherein the display object comprises a plurality of attributes wherein at least one attribute is indicative of computer readable instructions for a first user class and at least one other attribute is indicative of a second user class.

10. The method as recited in claim 9 wherein the first user class is an administrator class.

11. A computer-readable medium bearing program code for instructing a computer to carry out the steps recited in claim 1.

12. A system for displaying on a client computer information accessible over a computer network, comprising:

a data object containing at least some of the information, the object being stored in a data object database accessible via the computer network;

a software module stored in a computer module database accessible via the computer network;

a display specifier (DS) object stored in a directory service, the DS object coupling the data object to the software module; and a directory services user interface (DSUI) programmed to fetch the software module by way of the display specifier to display aspects of the data object.

13. The system as recited in claim 12 wherein the data object is stored in the directory service.

14. The system as recited in claim 12 wherein the display specifier is stored in the directory service.

15. The system as recited in claim 12 wherein the coupling of the data object to the software module is by way of a pointer.

16. The system as recited in claim 15 wherein the pointer is a unique identifier.

17. The system as recited in claim 12 wherein the software module is fetched from one of a local storage device, a cache, and a storage device accessible over the network.

18. The system of claim 12 wherein the software module is stored in a class store database.

19. The system as recited in claim 12 wherein the display specifier is coupled to the data object.

20. The system as recited in claim 19 wherein the display specifier is coupled to the data object by way of a naming convention.

21. The system as recited in claim 20 wherein the data object has a data object class and wherein the name of the display specifier is a function of the data object class.

22. The system as recited in claim 19 wherein the data object comprises a pointer to the display specifier.

23. A directory services user interface (DSUI) for use in displaying information associated with computer network information, the network including a data object comprising information to be displayed, a display specifier (DS) object stored in the directory service and including means for adding computer readable instruction to the DSUI from a remote location;

means for fetching the display specifier object;

means for retrieving the computer readable instructions by way of the display specifier object; and means for executing the computer readable instructions to display aspects of the data object on a client computer coupled to the network.

24. The DSUI as recited in claim 23 wherein the means for retrieving the computer readable instructions comprises searching the client computer based on a unique identifier identifying the computer readable instructions, the unique identifier being stored in the display specifier object.

25. The DSUI as recited in claim 23 wherein the means for fetching the computer readable instructions comprises querying a database on a server located on the network based on a unique identifier identifying the computer readable instructions, the unique identifier being stored in the display specifier object.

26. The DSUI as recited in claim 23 wherein the computer readable instructions comprise a script.

27. The DSUI as recited in claim 26 wherein the script comprises a JAVA script.

28. The DSUI as recited in claim 23 wherein the computer readable instructions comprise a component object model module.

29. The DSUI as recited in claim 28 wherein the component object module is stored in a class store.

30. The DSUI as recited in claim 23 wherein the means for retrieving the computer readable instructions comprises parsing the display specifier for a pointer to the instructions based on application specific attributes.

31. The DSUI as recited in claim 30 wherein the application specific attributes comprise administrator attributes.

32. A computer-readable medium having computer executable instructions for providing a user interface to attributes of system resources stored in a directory service, said computer executable instructions performing the steps of:

retrieving from the directory service a system object comprising a first attribute of a system resource;

determining the class of the system object;

retrieving a display object based on the class of the system object; and adding computer readable instructions to the user interface by way of the display object.

33. The computer-readable medium as recited in claim 32 wherein the system object comprises a second attribute containing the object class of the system object and wherein the step of determining the class of the system object comprises the step of:

determining the name of the object class attribute.

34. The computer-readable medium as recited in claim 33 wherein the step of retrieving the display object comprises the step of:

retrieving the display object as a function of the a name of the system object class.

35. The computer-readable medium as recited in claim 32 wherein the step of adding computer readable instructions comprises the steps of:

parsing the display object for a selected pointer to computer readable instructions;

retrieving the computer readable instructions by way of the pointer; and executing the computer readable instructions.

36. The computer-readable medium as recited in claims 35 wherein the pointer comprises a path name of a file containing computer readable instructions.

37. The computer-readable medium as recited in claim 36 wherein the file is a script file.

38. The computer-readable medium as recited in claim 36 wherein the file is an executable file.

39. The computer-readable medium as recited in claim 35 wherein the pointer is a unique identifier of a software module stored in a database.

40. The computer-readable medium as recited in claim 39 wherein the software module comprises a component object model module.

41. The computer readable medium as recited in claim 35 wherein the pointer is a DDL name.

42. The computer-readable medium as recited in claim 35 wherein the step of retrieving the computer readable instructions comprises the step of:

retrieving the computer readable instructions over a network by way of said pointer.

43. The computer-readable medium as recited in claim 42 wherein the step of retrieving the computer readable instructions further comprises the step of:

searching a local computer for the computer readable instructions before the step of retrieving the computer readable instruction from the network.

44. The computer-readable medium as recited in claim 35 wherein the step of parsing the display object comprises the steps of:

determining the environment in which the DSUI is operating; and, parsing from the display object attributes that are identified for use in the environment.

45. The computer-readable medium as recited in claim 44 wherein the environment is one of an end-user, an administrator, and an application.

* * * * *

UNITED STATES PATENT AND TRADEMARK OFFICE
CERTIFICATE OF CORRECTION

PATENT NO.    : 6,498,612 B1
DATED         : December 24, 2002
INVENTOR(S)   : Eric C. Brown et al.

It is certified that error appears in the above-identified patent and that said Letters Patent is hereby corrected as shown below:

<u>Title page,</u>
Item [63], Related U.S. Application Data, delete "Continuation of application No. 09/158,023, filed Sep. 21, 1998, and a";

<u>Column 5,</u>
Line 7, delete "rom" and insert -- from -- therefor;

<u>Column 13,</u>
Line 43, delete "and" and insert -- an -- therefor;

<u>Column 14,</u>
Line 4, delete "use" and insert -- used -- therefor.

Signed and Sealed this

Sixth Day of January, 2004

JAMES E. ROGAN
*Director of the United States Patent and Trademark Office*